United States Patent Office 3,682,901
Patented Aug. 8, 1972

3,682,901
PROCESS FOR INDOLES (RING CLOSURE OF NITRO COMPOUNDS)
Arthur Gaudens Mohan, 1280 Pleasant Valley Way, West Orange, N.J. 07052, and Richard Keith Madison, 50 Chestnut Hill Drive, Murray Hill, N.J. 07974
No Drawing. Filed July 30, 1969, Ser. No. 846,246
Int. Cl. C07d 27/56
U.S. Cl. 260—240 D                                   8 Claims

ABSTRACT OF THE DISCLOSURE

Process for preparing 2-substituted indoles (I) by reacting carbon monoxide at elevated temperature and super-atmospheric pressure in the presence of a co-catalyst composition, of which 5% palladium on carbon with a Lewis acid such as ferric chloride is representative, with an o-nitrobenzyl ketone (II):

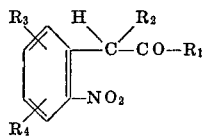

to form:

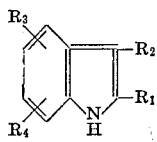

where $R_1$ is alkyl, aralkyl, aryl or styryl; $R_2$ is hydrogen, alkyl or aryl, and $R_3$ and $R_4$ typically are hydrogen or alkyl.

---

This invention relates to a process for preparing indoles. More particularly, it relates to a process for preparing 2-substituted indoles of Formula I

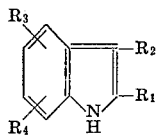

wherein $R_1$ is alkyl, aralkyl, aryl or styryl; $R_2$ is hydrogen, alkyl or aryl; and $R_3$ and $R_4$ independently are hydrogen, alkyl, aryl, alkoxy or halogen.

Heretofore, 2-substituted indoles have been prepared by various processes including (1) the Fischer indole synthesis whereby a phenylhydrazone of a ketone is cyclized, (2) the Madelung and Verley synthesis whereby an N-acyl derivative of an o-toluidine is cyclized, and (3) the Bischler and Mohlau synthesis whereby aniline and bromoacetophenone are coreacted.

A new and superior process for preparing 2-substituted indoles of Formula I has now been discovered. In the process of this invention, an o-nitrobenzyl ketone of Formula II below is reacted with carbon monoxide in the presence of a catalyst consisting essentially of a noble metal and a Lewis acid under conditions of super-atmospheric pressure and elevated temperature.

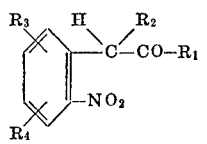

In Formula II, $R_1$, $R_2$, $R_3$ and $R_4$ have the same meaning as in Formula I above.

The o-nitrobenzyl ketones of Formula II wherein $R_1$ is aliphatic, i.e., alkyl or aralkyl, can be obtained from o-nitrophenylacetyl halides by the procedures of (1) J. Org. Chem. 25, 736 (1960) or (2) Chemistry and Industry 1955, 93. They can also be obtained by the nitration of benzyl alkyl ketones according to the procedure of J. Chem. Soc. 1938, 1402.

The o-nitrobenzyl ketones of Formula II wherein $R_1$ is aryl can be obtained by the Friedel-Crafts reaction of an o-nitrophenylacetyl halide with an aromatic hydrocarbon, such as benzene, naphthalene, and the like, according to well-known procedures as disclosed in Roczniki Chem. 39, 545 (1965) and Chem. Abs. 63, 16237 (1965). They can also be obtained by the nitration of benzyl aryl ketones according to the procedure of J. Chem. Soc. 1938, 1402. The o-nitrophenylacetyl halides can be obtained by standard procedures. For example, o-nitrophenylacetyl chlorides can be prepared easily by reacting the corresponding o-nitrophenylacetic acid with thionyl chloride. Representative acids (all known) include o-nitrophenylacetic acid, (2 - nitro - p - tolyl)acetic acid, (2 - nitro - 4 - biphenylyl) acetic acid, (4- and 5 - methoxy - 2 - nitrophenyl)acetic acid, (3,6- and 4,5 - dimethoxy - 2 - nitrophenyl)acetic acid, (4 - chloro - 2 - nitrophenyl)acetic acid, (4 - bromo-2-nitrophenyl)acetic acid, and the like.

Benzyl alkyl ketones which may be nitrated as described to form the reactants of Formula II include (all known) benzyl methyl ketone (also called phenyl-2-propanone), benzyl ethyl ketone, alpha-methylbenzyl methyl ketone, benzyl propyl ketone, alpha-methylbenzyl ethyl ketone, alpha-ethylbenzyl methyl ketone, benzyl butyl ketone, alpha-methylbenzyl propyl ketone, alpha-ethylbenzyl ethyl ketone, alpha-propylbenzyl methyl ketone, alpha-phenylbenzyl methyl ketone, and the like, and the corresponding ring-substituted benzyl alkyl ketones, such as p-methylbenzyl methyl ketone, p-phenylbenzyl methyl ketone, m- and p-methoxybenzyl methyl ketone, p-methoxy-alpha-methylbenzyl methyl ketone, m- and p-chlorobenzyl methyl ketone, and the like.

Benzyl aryl ketones which may be nitrated as described to form the reactants of Formula II include (all known) benzyl phenyl ketone, p-methylbenzyl phenyl ketone, p-methoxybenzyl phenyl ketone, p-chlorobenzyl phenyl ketone, alpha-methylbenzyl phenyl ketone, alpha-phenylbenzyl phenyl ketone, alpha-n-propylbenzyl phenyl ketone, alpha-n-pentylbenzyl phenyl ketone, benzyl 1-naphthyl ketone, benzyl 2-naphthyl ketone and the like.

The o-nitrobenzyl ketones of Formula II wherein $R_1$ is aralkyl can be obtained by a base catalyzed condensation of the appropriate o-nitrotoluene with an acyl halide, for example according to "Open Chain Nitrogen Compounds," vol. 2, p. 417, published by W. A. Benjamin, New York, 1966. Representative ketones which can be prepared in this manner include o-nitrodibenzyl ketone, o-nitrobenzyl alpha-methylbenzyl ketone, o-nitro-alpha-methylbenzyl beta-phenylethyl ketone, o-nitro-p-methylbenzyl p-chlorobenzyl ketone and the like.

The o-nitrobenzyl ketones of Formula II wherein $R_1$ is styryl can be obtained by the aldol condensation of the appropriate o-nitrobenzylmethyl ketone with an aromatic aldehyde, for example according to Organic Reactions 16, 35–38 (1968). Representative ketones which can be prepared in this manner include o-nitrobenzyl styryl ketone, o-nitro-alpha-methylbenzyl styryl ketone, o-nitro-p-methylbenzyl styryl ketone, o-nitrobenzyl p-methylstyryl ketone, o-nitrobenzyl p-chlorostyryl ketone, and the like.

Representative compounds of Formula II (all known) include o-nitrobenzyl methyl ketone (also called o-nitrophenyl-2-propanone), 3-methoxy-2-nitrobenzyl methyl ketone, 4,5-dimethoxy-2-nitrobenzyl methyl ketone, 4-chloro-2-nitrobenzyl methyl ketone, 4-bromo-2-nitrobzenzyl methyl ketone, and o-nitrobenzyl phenyl ketone [(also called 2-(o-nitrophenyl)acetophenone)].

The reaction between the o-nitrobenzyl ketone and carbon monoxide may be carried out in an autoclave or any other high pressure reactor. The o-nitrobenzyl ketone and catalyst in a solvent, if one is employed, are charged to the reaction vessel, the proper amount of carbon monoxide is added, and the reaction mixture is heated. Sequence of charging is not critical nor are the isolation and purification procedures. Normally, the reaction product mixture is centrifuged or filtered to remove the catalyst, the solvent is evaporated, and the products isolated. If desired, it may be purified by conventional methods such as crystallization or by vapor phase chromatography.

Suitable pressure for the process will be within the range of about 40 p.s.i.g. to 100,000 p.s.i.g. or higher. The preferred pressure is at least 1,000 p.s.i.g. The reaction proceeds at temperatures of at least 60° C., preferably between at least 150° C. and the temperature of decomposition of the starting material and the product. Reaction time will depend on reaction temperature and pressure and is generally inversely proportional thereto.

A solvent inert to reactants and products is normally employed to facilitate contact of the catalyst and the reactants. Suitable solvents include anhydrous liquids, such as benzene, toluene, xylene, aliphatic halogenated hydrocarbons, such as 1,1,2-trichloro - 1,2,2 - trifluoroethane; halogenated aromatic hydrocarbons, such as monochlorobenzene, dichlorobenzene and trichlorobenzene; glacial acetic acid, acetonitrile; ethers; such as diethyl ether, dibutyl ether and diphenyl ether; and carboxylic acids, anhydrides or esters, such as acetic acid, acetic anhydride and ethyl acetate; and the like.

The amount of carbon monoxide introduced into the reactor should be sufficient to provide at least three moles of carbon monoxide per nitro group, and preferably is employed in large excess. The required amount of carbon monoxide and the required super-atmospheric pressure are conveniently and preferably provided by pressurizing the reaction vessel with carbon monoxide after introduction of reactants and catalyst.

The catalyst for the reaction of this invention comprises a noble metal and a Lewis acid as defined in the reference book by Jack Hine, "Physical Organic Chemistry," 1962, McGraw-Hill Book Company, New York. The noble metal may be used either in a metallic or a chemically combined state. It may be employed either with or without a physical support. Among the noble metals which may be employed are platinum, palladium, rhodium, osmium, silver, gold, iridium, and mercury. Palladium is preferred. Among the chemical forms of these metals which can be used are the oxides, sulfates, nitrates and halides, as for example: platinum oxide, rhodium oxide, platinum chloride, rhodium chloride, platinum nitrate, platinum sulfate and the corresponding palladium compounds. The noble metals or compounds thereof may be employed singly or in admixture.

The Lewis acid component of the catalyst can be a halide (e.g., an iodide, bromide, vhloride or fluoride) of a metal such as tin, titanium, vanadium, molybdenum, gallium, iron, aluminum or copper.

Specific examples of Lewis acids are ferric chloride, ferrous chloride, stannic chloride, stannous chloride, aluminum chloride, titanium tetrachloride, vanadium pentoxide, molybdenum dioxide, aluminum bromide, gallium trichloride, copper tribromide, and cuprous chloride. Additional examples of the salt-type of Lewis acid are listed in the reference book by George A. Olah, "Friedel-Crafts and Related Reactions," vol. 1963, Interscience Publishers, New York. Bronsted acid-type of Lewis acids may be used. An example is anhydrous hydrogen chloride. Other Bronsted acids may be used provided they do not react with the starting materials or the products. The preferred Lewis acids are the chlorides of iron and the Lewis acids may be employed singly or in admixture.

The physical form of the catalyst can be varied as desired. The metal can be self-supported or deposited upon a support which disperses the metal so as to increase active surface area. Such porous supports include alumina, silica, carbon, barium sulfate, asbestos, bentonite, diatomaceous earth, and the like.

A preferred co-catalytic system consists of 5% palladium supported on carbon and ferric chloride. Other co-catalyst systems comprise $PdCl_2$ and $AlCl_3$; $PdO$ and $AlCl_3$; $Rh$ and $FeCl_3$; $Pd$ and $FeCl_2$; $PtO$ and $FeCl_3$.

The catalyst is used in an amount effective to form the desired products. This amount depends to some extent on reaction pressure and temperature, sensitivity of the starting materials towards decomposition, and other process conditions. A useful range is from about $10^{-5}$ to 0.1 mol of noble metal and from about $5 \times 10^{-4}$ to 0.05 mol of Lewis acid per nitrogen atom in the reactant, preferably about 0.02–0.001 mol of Lewis acid and 0.05 to 0.005 mol of noble metal per nitrogen atom.

The following examples are intended as further illustration of the invention but not necessarily as limitation of the scope thereof.

EXAMPLE 1

2-phenylindole

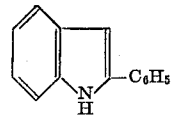

An autoclave charged with 2.41 g. o-nitrobenzyl phenyl ketone, 0.50 g. 5% palladium-on-carbon, 0.05 g. ferric chloride and 20 ml. of benzene is presurized to 7,500 p.s.i.g. with carbon monoxide and heated at 180–190° C. for 6 hours. After removal of the catalyst and solvent, a solution of the residue in chlorform is washed with dilute hydrochloric acid and decolorized with charcoal. Evaporation of the solvent yields the product, 2-phenylindole which, after crystallization from benzene, melts at 187.5–190° C. and is identical to an authentic sample of 2-phenylindole by melting point and infrared spectra.

When the procedure is followed with substitution of 5% rhodium-on-carbon for the palladium-on-carbon, the same product is obtained.

EXAMPLE 2

When the procedure of Example 1 is followed with substitution of o-nitrobenzyl methyl ketone, 2-methylindole is obtained.

The products of this invention have a wide variety of uses and how the compounds are employed is conventional or obvious. For example, 2- and 2,3-alkyl and aryl substituted indoles of Formula I are known as animal growth stimulants (U.S. Pat. 2,776,889), 2-arylindoles are employed as catalysts for styrene polymerization (British Pat. 684,489), and 2,3-diarylindoles are bactericides (U.S. Pat. 2,510,428) and insect proofing agents for wool fabrics (U.S. Pat. 2,510,432). Other fields of use include synthesis of dyes, alkaloids, plant hormones, and proteins.

We claim:

1. A process for preparing 2-substituted indoles which have the formula:

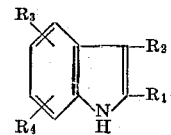

which comprises reacting carbon monoxide at an elevated temperature and superatmospheric pressure with a nitro compound of the formula:

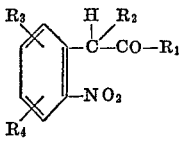

wherein $R_1$ is lower alkyl, phenyl, naphthyl or styryl; $R_2$ is hydrogen, lower alkyl or phenyl and $R_3$ and $R_4$ independently are hydrogen, lower alkyl, lower alkoxy, phenyl or halogen; in a molar ratio of carbon monooxide to the nitro compound of at least 3:1, in the presence of a catalyst consisting essentially of a noble metal selected from the group consisting of platinum, palladium, rhodium, osmium, silver, gold, iridium, mercury and their salts and a Lewis acid selected from the group consisting of the halides of tin, titanium, vanadium, molybdenum, gallium, iron, aluminum and copper.

2. The process of claim 1, wherein the noble metal is palladium or rhodium and the Lewis acid is an iron halide.

3. The process of claim 1, wherein the noble metal is palladium and the Lewis acid is ferric chloride.

4. The process of claim 1, wherein the temperature is at least 150° C. but below the decomposition temperature of said nitro compound.

5. The process of claim 1, wherein the reaction is conducted in a polar or non-polar solvent.

6. The process of claim 5, wherein the solvent is benzene.

7. A process according to claim 1, wherein the Lewis acid is vanadium pentoxide.

. A process according to claim 1, wherein the Lewis acid is molybdenum dioxide.

References Cited

Elderfield, Heterocyclic Compounds, vol. 3 (1952), pp. 18–21.

ALEX MAZEL, Primary Examiner

J. A. NARCAVAGE, Assistant Examiner

U.S. Cl. X.R.

260—319.1